US008490125B2

(12) United States Patent
Grubb (10) Patent No.: US 8,490,125 B2
(45) Date of Patent: Jul. 16, 2013

(54) VIDEO CONTENT NAVIGATION WITH REVENUE MAXIMIZATION

(75) Inventor: David Grubb, Doylestown, PA (US)

(73) Assignee: General Instrument Corporation, Horsham, PA (US)

(*) Notice: Subject to any disclaimer, the term of this patent is extended or adjusted under 35 U.S.C. 154(b) by 287 days.

(21) Appl. No.: 12/976,053

(22) Filed: Dec. 22, 2010

(65) Prior Publication Data

US 2012/0167125 A1 Jun. 28, 2012

(51) Int. Cl.
*H04H 60/32* (2008.01)
*H04H 9/00* (2006.01)

(52) U.S. Cl.
USPC .......... 725/14; 725/61; 725/86; 725/87; 725/100; 725/131; 725/139; 725/151

(58) Field of Classification Search
USPC .......... 725/14, 61, 86–87, 100, 131, 139, 725/151
See application file for complete search history.

(56) References Cited

U.S. PATENT DOCUMENTS

| | | | |
|---|---|---|---|
| 6,564,381 B1* | 5/2003 | Hodge et al. ............. | 725/97 |
| 7,493,341 B2 | 2/2009 | Israel et al. | |
| 2002/0152458 A1* | 10/2002 | Eyer et al. ............. | 725/1 |
| 2002/0194607 A1 | 12/2002 | Connelly | |
| 2003/0167471 A1* | 9/2003 | Roth et al. ............. | 725/87 |
| 2005/0125732 A1 | 6/2005 | Safadi et al. | |
| 2006/0031882 A1 | 2/2006 | Swix et al. | |
| 2006/0168623 A1 | 7/2006 | Khoo et al. | |
| 2007/0027744 A1* | 2/2007 | Carson et al. ............ | 705/10 |
| 2007/0143804 A1 | 6/2007 | Wang | |
| 2007/0250864 A1 | 10/2007 | Perez | |
| 2007/0277202 A1 | 11/2007 | Lin et al. | |
| 2008/0294607 A1* | 11/2008 | Partovi et al. .......... | 707/3 |
| 2009/0133071 A1* | 5/2009 | Sakai et al. ............ | 725/46 |
| 2009/0210902 A1* | 8/2009 | Slaney et al. .......... | 725/34 |
| 2009/0320059 A1* | 12/2009 | Bolyukh .............. | 725/32 |
| 2010/0169932 A1 | 7/2010 | Grubb et al. | |

OTHER PUBLICATIONS

PCT Search Report & Written Opinion, RE: Application #PCT/US2011/065871; Mar. 26, 2012.
Jorge Abreu, et al, "2BeOn—Interactive television supporting interpersonal communication", Proceedings of the Eurographics Workshop on Multimedia, XX, XX; Sep. 8, 2001; pp. 1-10.

* cited by examiner

*Primary Examiner* — Mulugeta Mengesha
(74) *Attorney, Agent, or Firm* — Stewart M. Wiener (57) ABSTRACT

A method for maximizing revenue in a video-on-demand (VOD) system operated by a service provider is disclosed. For a plurality of VOD content items, an expected revenue value to the service provider for each content item is calculated, based on an estimated value of revenue for the content item, weighted by an estimated probability that a subscriber will select the content item for viewing. The one or more highest ranked content items of the plurality of VOD content items is selected, rank being determined such that content items having higher expected revenue values are ranked higher than content items having lower expected revenue values. Identifying information about the one or more highest ranked content items is delivered to a set-top device associated with the subscriber, for presentation to the subscriber on a menu from which the one or more highest ranked content items can be selected for viewing.

26 Claims, 6 Drawing Sheets

VIDEO CONTENT NAVIGATION WITH REVENUE MAXIMIZATION

BACKGROUND

Video-on-Demand (VOD) typically refers to an area of technology that allows client device end-users to select video content or other content from a source, such as a central server, for viewing on a suitable end-user display device, such as a television or a computer monitor. One type of VOD system is a "streaming" VOD system, in which video content or other content is streamed from the source to an end-user client device and viewing of the content can begin as soon as the content streams over a suitable network connection from the source to the end-user client device. Another type of VOD system is a "download" VOD system, in which content initially is downloaded to a video processing device, such as a set-top box, before end-user viewing begins. Typically, almost all download VOD systems and many streaming VOD systems allow the end-user to pause, fast forward, and rewind the content, as well as to view the content at any time.

A VOD server system is typically maintained by a service provider, which can be, for example, a television service provider (e.g., a national or local television network), a cable television service provider or multiple system operator (MSO), an Internet service provider, a satellite broadcast system service provider, or other suitable service provider.

Current VOD navigation systems use hierarchical navigation schemes based on metadata. For example, conventional VOD systems include a navigation function whereby the VOD library can be browsed by a client set-top application. The presentation of titles to the user in existing implementations is generally based on hierarchical information based on metadata. For example, episode 5 of season 4 of the television show Lost might be found by selecting menu items having labels such as VOD/TV/ABC/Lost/Season 4/Episode 5, where each of the items appears on successive screens or in a nested menu. In a notation used in the written description of the present application to represent such screens or menus, successive or nested menu items are separated by a forward slash ("/").

A second method for navigation that can complement the hierarchical method is to add the capability to list content based on criteria such as popularity. So, for example, the same episode of Lost might also be found by selecting menu items having labels such as This Week's Top TV Episodes/Lost Episode 5, assuming Episode 5 is among the then-current week's most popular television episodes. Criteria can also be based on stored personal information, so that the menu choices are determined by examining past user behavior.

As VOD libraries grow, service providers may miss revenue generation opportunities because consumers will have to wade through more titles and categories that are not interesting or relevant to them. Also, a consumer may choose a title that generates less revenue for the service provider, simply because the consumer sees it first.

SUMMARY

In one embodiment of the present invention, a method is provided for maximizing revenue in a video-on-demand (VOD) system operated by a service provider. For a plurality of VOD content items, an expected revenue value to the service provider for each content item is calculated, based on an estimated value of revenue for the content item, weighted by an estimated probability that a subscriber will select the content item for viewing. The one or more highest ranked content items of the plurality of VOD content items is selected, rank being determined such that content items having higher expected revenue values are ranked higher than content items having lower expected revenue values. Identifying information about the one or more highest ranked content items is delivered to a set-top device associated with the subscriber, for presentation to the subscriber on a menu from which the one or more highest ranked content items can be selected for viewing.

In a further embodiment of the present invention, a video-on-demand (VOD) system is operated by a service provider. The system includes a VOD server communicatively coupled to a content database comprising a plurality of VOD content items. The system also includes a VOD revenue processor configured to calculate, for the plurality of VOD content items, an expected revenue value ($ER_T$) to the service provider for each content item. A user interface (UI) server is communicatively coupled to the VOD revenue processor and to the VOD server. The UI server is configured to deliver identifying information about the one or more content items that are highest ranked by $ER_T$ values, to a set-top device associated with a subscriber, for presentation to the subscriber on a menu from which the one or more highest ranked content items can be selected for viewing.

DETAILED DESCRIPTION

Aspects of the present invention provide a method for the presentation of VOD navigation screens which optimizes the placement of shows in the interface in order to maximize revenue for a service provider. In an illustrative embodiment, the revenue optimization method can account for both pay per view titles as well as advertising supported "free" titles. For example, in the case of pay per view content, the calculation of revenue can account for factors such as the price (or the service provider's share of the price) of the content, as well as the odds of that content being selected based on historical "click through" data. In a further example, in the case of advertising supported content, the calculation can account for factors such as the number of advertising availabilities ("avails") that the operator receives for such content, the CPM (cost per thousand impressions) that those avails can be sold for (e.g., from an advertising campaign manager), the historical success rate of the program or the episode in retaining the viewer so the ads are seen, and the historical "click through" rate for the content.

Before describing in detail embodiments that are in accordance with the present invention, it should be observed that the embodiments reside primarily in combinations of method steps and apparatus components related to a system and method for navigation of video-on-demand content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Exemplary VOD System

Figure 1:
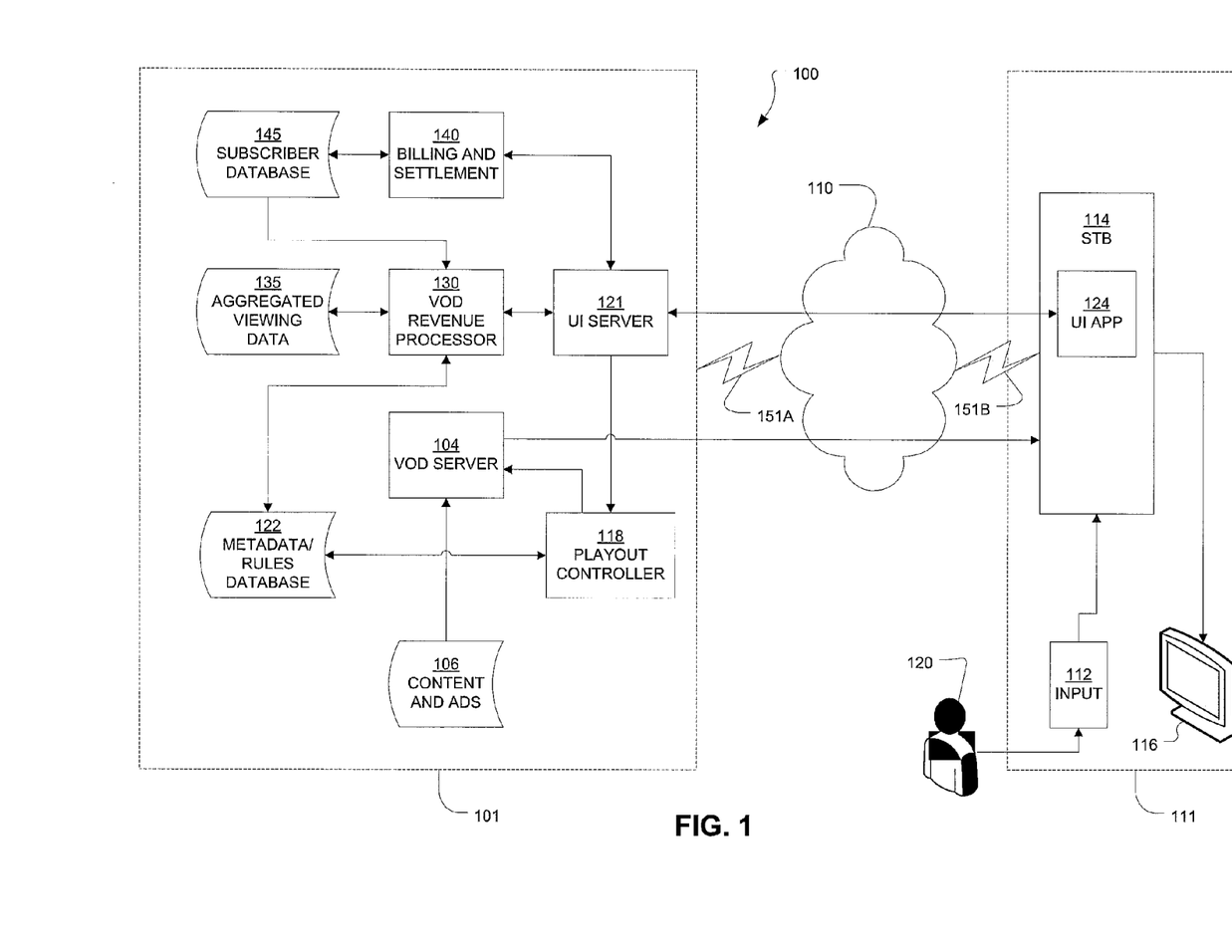
FIG. 1 is a block diagram that illustrates an exemplary VOD system in accordance with an embodiment of the present invention.

FIG. 1 illustrates an exemplary VOD system 100 in accordance with an embodiment of the present invention. However, it will be understood by a person having ordinary skill in the art that aspects of the invention can be practiced using a system having other than the specific features or limitations of the illustrative VOD system 100 described herein.

VOD system 100 includes a server system 101 and at least one client system 111, the two of which are connected by an access network 110. For example, communication link 151A connects the server system 101 to the access network 110, and communication link 151B connects the client system 111 to the access network 110. Conventional VOD systems typically include a plurality of client systems 111, not shown. The server system 101 stores, manages and delivers VOD content requested by a client system 111 via the access network 110. Access network 110 and communication links 151A, 151B can include, for example, a transmission medium such as an optical fiber, a coaxial cable, or other suitable transmission media or wireless telecommunications.

The server system 101 typically is located in a headend (not shown) or other suitable location within the VOD system 100. The headend typically is a regional or local hub that is part of a larger service provider distribution system, such as a cable television distribution system. The VOD system 100 and other conventional VOD systems typically are based on a central server architecture. In such an architecture, the server system 101 typically is centrally located with respect to a plurality of client systems 111, and connects to each client system 111 directly via a dedicated transmission medium (in some embodiments, communication link 151B) of access network 110. In other embodiments, the VOD system 100 can be distributed; for example, VOD system 100 can comprise a plurality of server systems 101 located in one or more headends.

In an embodiment, an exemplary server system 101 includes a VOD server 104, a playout controller 118, a user interface (UI) server 121, a billing and/or settlement server 140, and a VOD revenue processor 130. In some embodiments, the functionality of some or all of the foregoing servers, controllers, or processors can be separated or combined with one another, and can be executed or hosted on one or more processors or servers.

Server system 101 also includes database 106 (containing, for example, media content and advertisements), and a number of additional databases; for example, a metadata and/or rules database 122 containing information about content in database 106, a database of aggregated viewing data 135, and a subscriber database 145. In some embodiments, database 106 and/or any of the additional databases can comprise a plurality of databases. In further embodiments, database 106 and/or any of the additional databases can be distributed over a plurality of servers and/or storage media.

UI server 121 receives, through access network 110, requests from a UI application 124 of client system 111 and forwards these requests to playout controller 118. UI server 121 and UI application 124 exchange information with one another through access network 110; for example, the UI server 121 can send information for presentation to user 120, and the UI application 124 can send information, commands, and the like, received via input device 112 from user 120.

Playout controller 118 controls VOD server 104 for delivery of the playout of a content package provided by server 101. In an illustrative example, when a user 120 selects a VOD program, or broadcast content, playout controller 118 can establish a playout schedule for the content and advertising elements based on content rules stored in metadata/rules database 122, e.g., content rules which can come from the network operator, the programmer, or from programmer affiliates. The choice of additional advertising content (e.g., linear insertions, overlays, squeeze backs, and the like) can be dictated by the content rules or may come from an advertisement engine, not shown. The playout controller 118 can then establish a playlist of the desired content including the sequencing of program content and advertisement content; for example, by inserting additional advertisement content into an original content program compiled by VOD server 104.

VOD server 104 receives requests for content from playout controller 118, interprets the requests, pulls requested content from database 106, and delivers to client system 111 a content package corresponding to the requested content. For example, the content package can be delivered via a video processor (not shown) in server system 101 that receives data from VOD server 104 and prepares and sends the data through access network 110 following proper protocols.

The billing and/or settlement server 140 receives information (e.g., from UI server 121) concerning VOD content delivered to client system 111, and has access to subscriber database 145, for ensuring that subscribers (e.g., user 120) are properly billed for VOD content. Billing and/or settlement server 140 can also be configured to manage settlement transactions, e.g., payments due to and from third party entities such as content providers, advertisers, advertising campaign managers, and the like.

Client system 111 includes a set-top device 114, an input device 112, and a display 116. Examples of display 116 include a television or a monitor. A client system 111 typically is located in end-user (subscriber) locations, such as a home or office of a user 120. Often, a home or other end-user location has only one client system 111, although in many cases, more than one client system 111 can be located in the same end-user location, e.g., as part of a home network or business network configuration.

It will be understood by a person having ordinary skill in the art that the terminology "set-top" does not in any way limit the physical placement of the device 114; that is, the device 114 need not be positioned on top of a television set. Each set-top device 114 is any suitable signal processing device or system for processing video signals, such as any signal converter or decoder (set-top) box, or other suitable computing device or video device with set-top box and/or cable modem capabilities, including a residential gateway, an internet protocol (IP), satellite or cable digital video recorder, a digital video disk (DVD) recorder, a computer, or a home media server system. In further embodiments, set-top device 114 can be a laptop, notebook, or tablet computer, or a mobile device, or can be built into the display 116. An exemplary set-top device 114 comprises a computing device that connects the display 116 and an external signal source, turning the signal into a content stream that the display 116 is able to render and display. For example, set-top device 114 can convert data signals to audio/video content and output the data to display 116. Set-top device 114 is communicatively coupled to the display 116 via a wired or wireless connection.

A set-top device 114 can be completely or partially configured in the form of hardware circuitry and/or other hardware components within a larger device or group of components. Alternatively, set-top device 114 can be completely or partially configured in the form of software, e.g., as processing instructions or one or more sets of logic or computer code. In such configuration, the logic or processing instructions typically are stored in a data storage device, which typically is coupled to a processor or controller. Both the data storage device and the processor or controller can be included as part of a set-top device 114, although such is not necessary. The processor or controller accesses the necessary instructions from the data storage device and executes the instructions or transfers the instructions to the appropriate location within the set-top device 114. An exemplary set-top device 114 is able to receive input commands from input device 112 and send requests embodied in the input commands through access network 110 to server system 101.

A user 120 can operate input device 112 to send commands to the set-top device 114; for example, by using input device 112 to control UI application 124 (e.g., for navigation and selection of content items from menus). Input device 112 is communicatively coupled to the set-top device 114 either via a wired or wireless connection. In some embodiments, input device 112 can be a remote control device. In further embodiments, input device 112 can be a computer (e.g., a desktop, laptop, notebook, or tablet computer), or a mobile device or smartphone, and/or can be completely or partially configured in the form of software running on a computer. In still further embodiments, input device 112 can be built into the set-top device 114.

In an exemplary embodiment, upon receipt of input commands, such as changing to a new channel, UI application 124 causes the set-top device 114 to send corresponding instructions upstream through access network 110 to UI server 121. UI server 121 is able to convert the instruction stream to a form that playout controller 118 can interpret and sends the instructions to playout controller 118. Playout controller 118 requests content from VOD server 104, which interprets the request and pulls the requested content from database 106, and delivers the content to set-top device 114.

Database 106 stores items of content. The content can be any video and/or audio, non-limiting examples of which include movies, television programs, music, games, etc. Further, the content may be pre-assembled with advertisements disposed therein, or playout controller 118 may cause insertion of advertisements into requested content. In some embodiments, advertisements to be inserted are stored in database 106. An advertisement can be any video or audio that is not the content, non-limiting examples of which include commercials. The combination of content and advertisements, if included, is the content package.

Revenue maximization data that is associated with the content, as more fully described below, can be stored, for example, in metadata/rules database 122. In further embodiments, all or portions of metadata/rules database 122 can be included in database 106 or in other additional databases.

Expected Revenue Maximization

Figure 2:
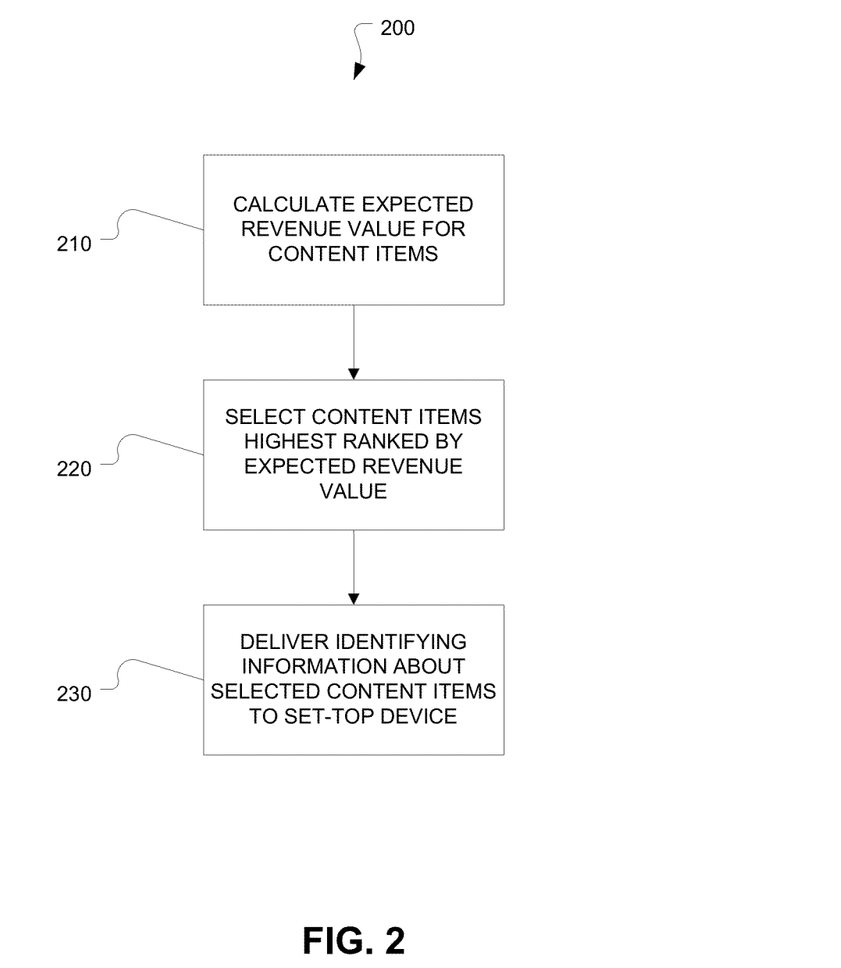
FIG. 2 is a flow diagram that illustrates a method according to an embodiment of the present invention.

FIG. 2 is a flow diagram that illustrates a method 200 according to an embodiment of the present invention. Featured results on a VOD navigation screen are determined by method 200, which seeks to maximize the expected value of the revenue generated for the service provider.

In one embodiment, method 200 includes a step 210 of calculating an expected revenue value ($ER_T$) to the service provider for each content item (T) of a plurality of VOD content items. In an embodiment, the calculation in step 210 is performed by VOD revenue processor 130. The calculation can be based on an estimated value of revenue ($R_T$) for the content item, weighted by an estimated probability ($P_T$) that a subscriber will select the content item for viewing. Examples of this calculation are set forth and discussed below.

In step 220, the one or more highest ranked content items of the plurality of VOD content items are selected (e.g., by the VOD revenue processor 130, or by UI server 121). A rank is determined such that content items having higher $ER_T$ values are ranked higher than content items having lower $ER_T$ values.

In step 230, identifying information about the one or more highest ranked content items is delivered to set-top device 114 associated with the subscriber (e.g., user 120), for presentation to the subscriber on a menu from which the one or more highest ranked content items can be selected for viewing.

Determining $ER_T$

For each content item (T), the revenue maximization data (stored, for example, in metadata/rules database 122) can include a value $R_T$ (i.e., revenue for a title), which represents an estimated value of revenue to be generated for the service provider when the content item is selected and viewed by a subscriber.

The revenue maximization data can also include for each content item a value $P_T$ (i.e., probability for title), where $P_T$ represents an estimated chance of a subscriber selecting the particular content item for viewing, e.g., by selecting it from a navigation menu. In one embodiment, a relatively simple calculation of $P_T$ can be performed using aggregated historical information for a plurality of subscribers (e.g., from aggregated viewing data 135). In a further embodiment, for example, $P_T$ can be determined or refined on a per-subscriber basis using information specific to the particular subscriber for whom $P_T$ is to be determined. For example, a more targeted calculation of $P_T$ can be performed using individualized information (e.g., from subscriber database 145) about the particular subscriber to whom the content item may be offered in a navigation menu. In still further embodiments, $P_T$ can be calculated using the individualized information in combination with the aggregated information. Calculations of $P_T$ can also use additional kinds of revenue maximization data, as set forth in greater detail below.

For a particular content item, an expected revenue value $ER_T$ (i.e., expected revenue for title), can be calculated, in an embodiment, as the product of $R_T$ and $P_T$. In calculating the expected revenue value, the estimated value of the revenue for a content item is weighted by the probability that a viewer will choose the content item. The complexity of the method for determining $ER_T$ is generally a function of the quantity and quality of data available for determining a value of $P_T$. Thus, for a given content item, an exemplary calculation of $ER_T$ is of the form:

$$ER_T = P_T * R_T$$

In an attempt to maximize revenue, a list of content items can be ordered by the $ER_T$ value of each content item, so that content items having relatively higher values of $ER_T$ are ranked highest on the list (e.g., for prioritized or featured presentation to the subscriber on a navigation menu from which the content item can be selected).

In a further embodiment, to facilitate comparisons of $ER_T$ for content items having differing durations, a duration-adjusted value of $ER_T$ can be obtained by dividing $ER_T$ by the duration of the content item T. In an illustrative example, a three-minute music video may generate more revenue per minute than a thirty-minute television episode, or a two-hour movie may generate more revenue per minute than a one-hour television episode.

Determining $R_T$

For a pay-per-view (PPV) content item, exemplary revenue maximization data associated with content can include a price per subscriber associated with viewing the content item, and/or a revenue share to the service provider associated with the content item. The revenue share to the service provider associated with the content item can, for example, be expressed as a percentage of the price per subscriber, or as a dollar amount. For a PPV content item, an exemplary calculation of $R_T$ is of the form:

$$R_T = \text{Revenue Share} * \text{Price of Title}$$

For an advertising supported content item, exemplary revenue maximization data associated with content can include a quantity of ad avails that the service provider receives for that content item, and a cost per impression. Typically, the cost per impression is determined based upon a cost per thousand impressions (CPM) that those avails can be sold for (e.g., from an advertising campaign manager), divided by 1,000. In an embodiment, the exemplary revenue maximization data can also include a retention rate; e.g., a historical success rate of the content item in retaining viewers. For example, an illustrative retention rate can be a percentage or other value indicating how much of the content item is actually shown before an average subscriber stops viewing the content item, since subscribers may stop watching a piece of content before all of the ads are shown. In a further illustrative example, a retention rate can be the number of viewers who finish watching a content item divided by the number of viewers who begin watching the content item.

For an advertising supported content item, an exemplary calculation of $R_T$ is of the form:

$$R_T = \text{Avails for service provider} * \frac{CPM}{1000} * \text{Retention rate}$$

Figure 3:
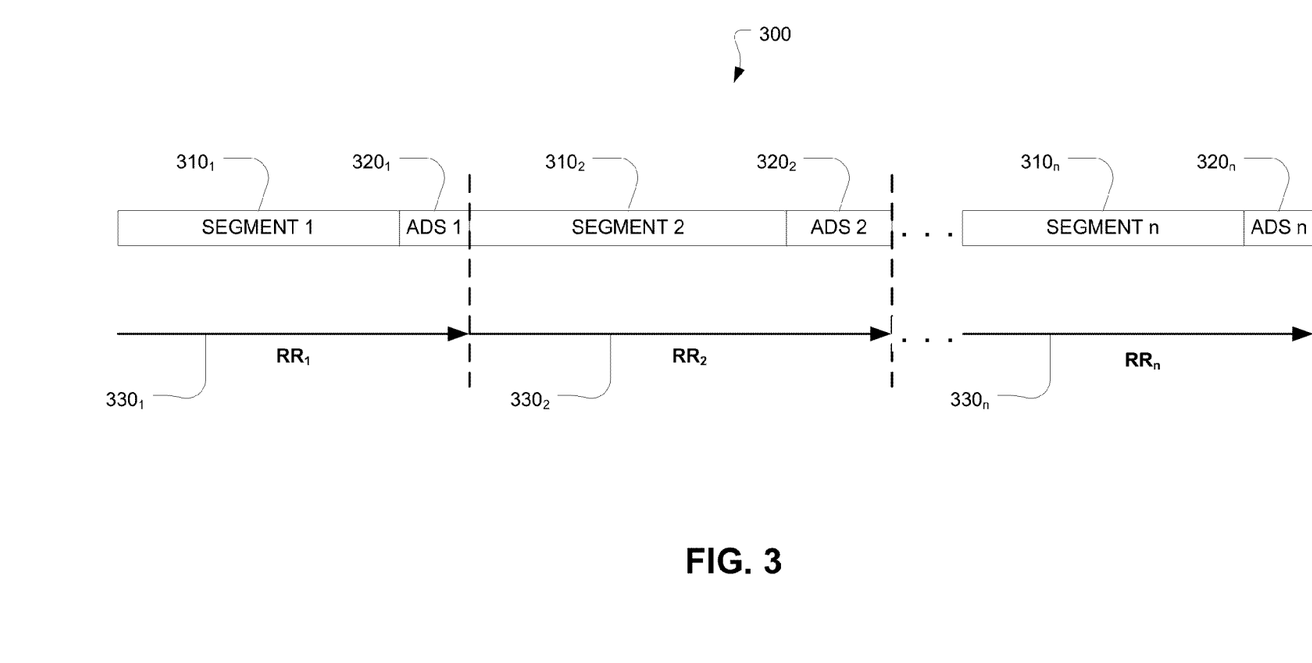
FIG. 3 is a time line diagram that illustrates a content item according to an embodiment of the present invention.

FIG. 3 is a time line diagram that illustrates a content item 300 according to a further embodiment of the present invention. The determination of a retention rate can be further refined by considering the content item 300 as a plurality of n program segments $310_1, 310_2 \ldots 310_n$ (each a segment 310) and a corresponding plurality of n commercial breaks $320_1, 320_2 \ldots 320_n$ (each a break 320). Each segment 310 is followed by a corresponding break 320. Each break 320 can include one or more advertisements, which may or may not include advertising availabilities for the service provider. Thus, each break 320 contains zero or more advertising availabilities for the service provider. For the time period that includes a segment 310 and its following break 320, a retention rate 330 can be determined. For example, retention rate $330_n$ ($RR_n$) is a retention rate for the time period spanning segment $310_n$ and break $320_n$.

In some embodiments, a retention rate for the content item 300 can be calculated based on a product of the retention rates $330_1, 330_2 \ldots 330_n$. In a more detailed embodiment, where n is the number of segment-and-break pairs in content item 300, and $A_i$ is the number of advertising availabilities for the service provider in break $320_i$, and $RR_k$ is the retention rate $330_k$ for the time period spanning segment $310_k$ and break $320_k$, an exemplary calculation of $R_T$ is of the form:

$$R_T = \sum_{i=1}^{n} \left( A_i \cdot \frac{CPM}{1000} \cdot \prod_{k=1}^{i} RR_k \right)$$

It is noted that in some cases, a subscriber can choose whether to receive a particular content item in a PPV fashion or in an advertising supported fashion. In such a case, an exemplary approach would be to regard these as two different content items for purposes of calculating $R_T$ and $P_T$.

Determining $P_T$ Using Non-Individualized Data

Further exemplary revenue maximization data can include various non-individualized data useful in determining $P_T$ for a content item. For example, a historical "click through" rate for the content can be determined and recorded (e.g., in aggregated viewing data 135), for a plurality of subscribers over a period of time, based on observing the number of times a title is presented in navigation screens and the number of times it is selected. The plurality of subscribers may, if desired, be segmented geographically, demographically, or by other criteria, in order to provide more detailed subsets of data.

Additional exemplary data useful in determining $P_T$ for a content item can include other measurements of popularity. Popularity may be determined, for example, using audience measurement ratings such as Nielsen ratings, or by using conventional audience measurement techniques available to the service provider. In a further example, for movies, publicly known information about box office revenues may be included as a factor. In some embodiments, additional factors for determining popularity may include the use of Internet sources indicative of public interest in the content item (e.g., frequency of mentions on Twitter, or trending searches on Google).

Further exemplary data useful in determining $P_T$ for a content item can include historical "click through" rates or other measurements of popularity for similar or related content items. This is especially useful for television content that is episodic or serial in nature, where the popularity of one episode may be inferred from the popularity of other episodes, or of the series as a whole.

Still further exemplary data useful in determining $P_T$ for a content item can include the number of weeks the content item has been available on the VOD system 100; for example, it may be assumed that popularity will be relatively high for newly available content items, and will decrease over time.

Each of the abovementioned items of exemplary non-individualized data useful in determining $P_T$ for a content item can be weighted, e.g., by a factor determined by the service provider using techniques that may include statistical modeling, trial and error, estimates by persons having skill in a relevant field such as audience measurement, and the like. Accordingly, an exemplary calculation of $P_T$, using a number n of exemplary non-individualized data items D, each having an associated weighting factor W, is of the form:

$$P_T = \sum_{i=1}^{n} (Wi \cdot Di)$$

In some embodiments, the value of $P_T$ thus determined using non-individualized data can be stored, e.g., in metadata/rules database 122, with other metadata relating to the content item T.

Determining $P_T$ Using Individualized Data

Individualized information about the subscriber can be used in a further embodiment to perform a more complex calculation of $P_T$. For example, in some embodiments, the stored non-individualized value of $P_T$ can be refined or weighted using individualized data as discussed below. In further embodiments, a value of $P_T$ can be calculated using any combination of individualized and/or non-individualized data, without the use of any stored non-individualized value of $P_T$.

When determining $P_T$ for a content item with respect to a known particular subscriber (e.g., user 120), further useful exemplary data can include the subscriber's previous viewing history (both linear and on demand), demographics of the subscriber (e.g., information on gender, age, income), geographic information for the subscriber (e.g., home address, business address, current location), recorded preferences expressly selected by the subscriber (e.g., favorite programs, genres, networks), and the like. In an embodiment, such individualized information may be stored, for example, in subscriber database 145. In further embodiments, such individualized information may be stored at set-top device 114 and transmitted to VOD revenue processor 130 (e.g., via UI application 124 and UI server 121), as needed or as requested.

In a further embodiment, the individualized information can include a subscriber's preferences (e.g., expressed preferences or historical viewing data) for content having various durations. In illustrative examples, one subscriber may frequently watch short-form content (e.g., video snacking), while another may rarely watch such content. Another subscriber may watch thirty-minute television programs more frequently than sixty-minute programs. Still another subscriber may prefer movies to television programming. Accordingly, $P_T$ can be weighted to account for the fact that content of a given duration tends to be more popular or less popular with the particular subscriber.

In a still further embodiment, individualized information about the subscriber can include social networking information. For example, the subscriber can make available to VOD system 100 one or more lists of friends on third party social networking platforms (e.g., Facebook friends, Twitter followers or followees, LinkedIn connections, and the like), or on a social networking platform associated with the service provider. In some embodiments, such friends can be matched with entries in subscriber database 145. In further embodiments, such friends can make television viewing preferences available to the subscriber by any of numerous means (e.g., "like" on Facebook). In other embodiments, such friends can allow all or part of their current or historical television viewing record to be available to the subscriber. Thus, information from the subscriber's social network can be included among the factors for determining, for the subscriber, an individualized measure of popularity when determining $P_T$ for a content item.

Each of the abovementioned items of exemplary individualized data useful in determining $P_T$ for a content item can be weighted, e.g., by a factor predetermined by the service provider using techniques that may include statistical modeling, trial and error, estimates by persons having skill in a relevant field such as audience measurement, and the like. Accordingly, an exemplary calculation of $P_T$, using a number n of exemplary data items D which may be either individualized or non-individualized, each having an associated weighting factor W, is also of the form:

$$P_T = \sum_{i=1}^{n} (Wi \cdot Di)$$

A further exemplary calculation of $P_T$ can use a previously stored non-individualized calculation of $P_T$ as a first data item (referred to here as $D_0$), weighted by a first weighting factor ($W_0$) that can be predetermined by the service provider as discussed above. In this way, the stored non-individualized calculation of $P_T$ can be used as a preliminary value, and if desired, can be refined or enhanced using individualized data. Such an exemplary calculation of $P_T$, using a number n of individualized exemplary data items D, each having an associated weighting factor W, is of the form:

$$P_T = \sum_{i=0}^{n} (Wi \cdot Di)$$

Exemplary Navigation Menus

Figure 4:
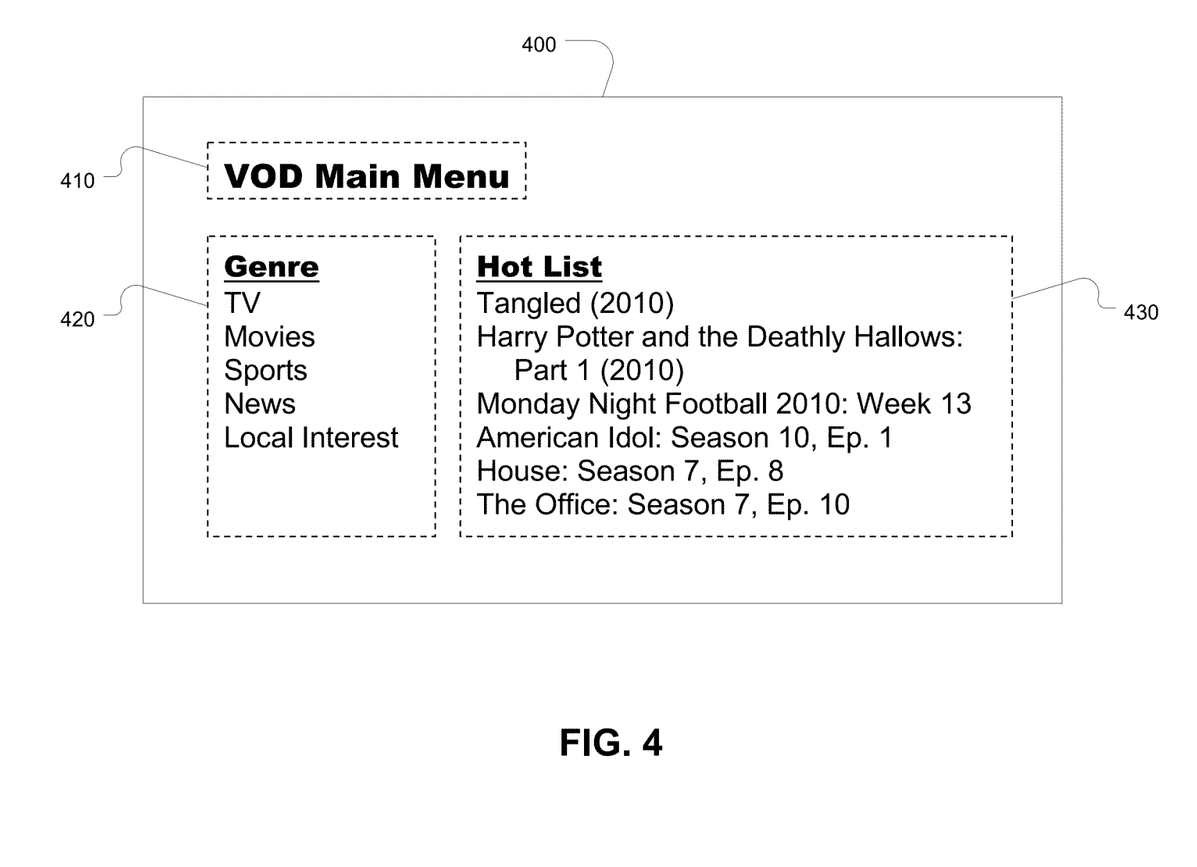
FIG. 4 illustrates a first exemplary VOD navigation screen in accordance with an embodiment of the present invention.
Figure 5:
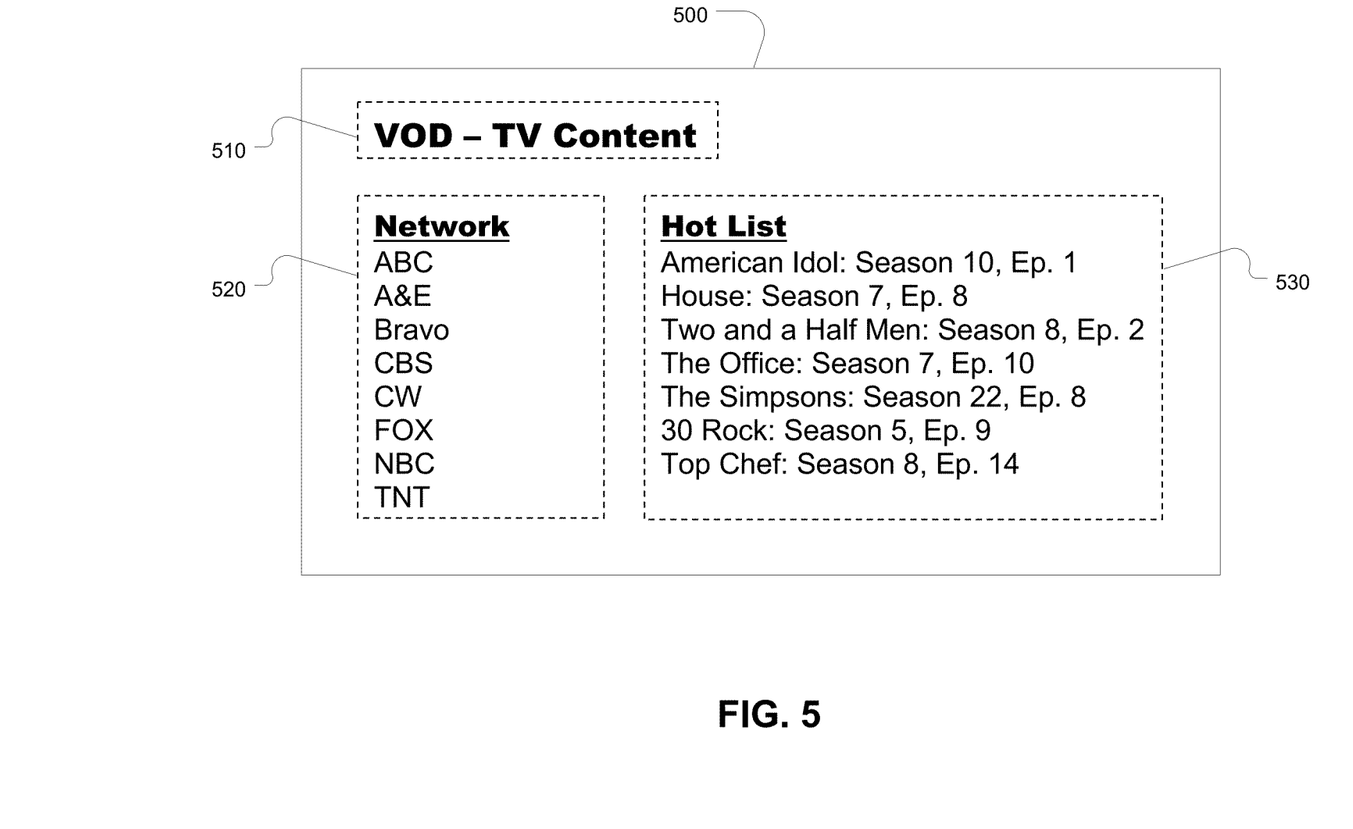
FIG. 5 illustrates a second exemplary VOD navigation screen in accordance with an embodiment of the present invention.
Figure 6:
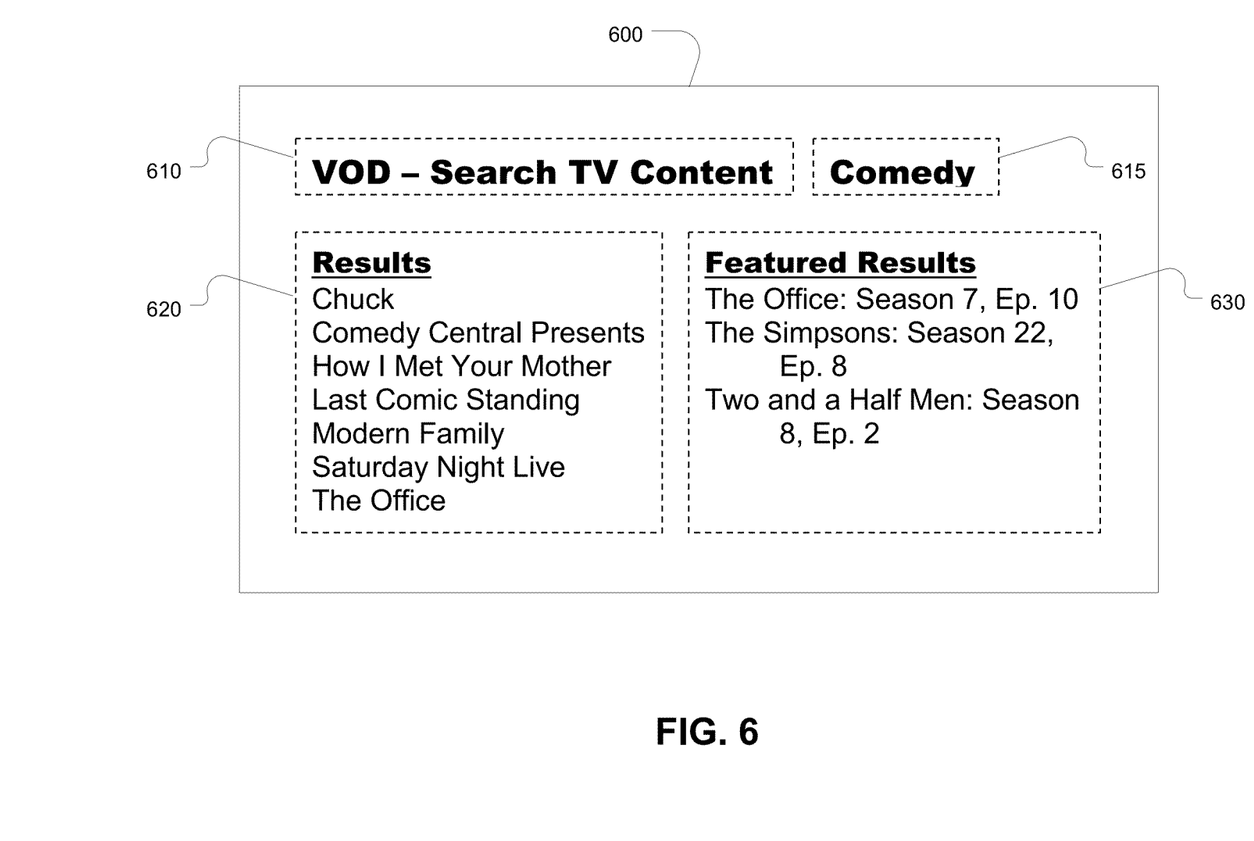
FIG. 6 illustrates a third exemplary VOD navigation screen in accordance with an embodiment of the present invention.

FIGS. 4-6 illustrate exemplary VOD navigation screens in accordance with an embodiment of the present invention. It will be understood that the screen layouts and elements, including captions, genres, networks, titles, and specific content items, that are depicted in FIGS. 4-6 are illustrative and non-limiting examples. For example, while FIGS. 4-6 depict lists of items in a text format (such as lists of television content items described by program name, season, and episode number), lists may include other or additional information, such as episode titles, summaries, ratings, logos, images, screenshots or thumbnails of one or more selected video frames, animated or moving pictures, hyperlinks to further information, and the like. Further examples of lists may be in the form of a grid, table, or other kind of layout, may be scrollable or non-scrollable, and may rotate through a number of selections.

FIG. 4 illustrates a first exemplary VOD navigation screen in accordance with an embodiment of the present invention. In the illustrative VOD main menu screen 400, a caption 410 indicates that the main menu is being viewed. An exemplary genre menu 420 is depicted, containing a list of genres in which VOD titles may be categorized. A revenue-optimizing menu 430, shown here with the exemplary title "Hot List," lists a plurality of VOD content items that are selected according to an embodiment of the invention. Revenue-optimizing menu 430 lists content items, selected across all available genres, having the highest values of $ER_T$.

The method can also be applied in conjunction with appropriate filters to feature content on successive navigation screens or in search results. For example, a further menu screen can show a list of recommended television programs that are generated by the revenue maximization method. FIG. 5 illustrates a second exemplary VOD navigation screen in accordance with an embodiment of the present invention. It will be understood that the captions, networks, titles, and specific content items depicted in FIG. 5 are illustrative and non-limiting examples. In the illustrative VOD television content screen 500, a caption 510 indicates that television content is being viewed. An exemplary network menu 520 is depicted, containing a list of television networks from which VOD titles may originate. A revenue-optimizing menu 530, shown here with the exemplary title "Hot List," lists a plurality of VOD content items that are selected according to an embodiment of the invention. Revenue-optimizing menu 530 lists television content items, selected across all available networks, having the highest values of $ER_T$.

In a further embodiment, if the user then searches for "comedy," the recommended or featured results would be selected from television programs matching the comedy genre that are likely to generate the highest revenue. FIG. 6 illustrates a third exemplary VOD navigation screen in accordance with an embodiment of the present invention. It will be understood that the captions, genres, titles, and specific content items depicted in FIG. 6 are illustrative and non-limiting examples. In the illustrative VOD search screen 600, a caption 610 indicates that television content is being searched, and a second caption 615 indicates that the search is limited to the genre of comedy. It will be readily apparent to a person having ordinary skill in the art that parameters for limiting the search may be received from the subscriber using any of various suitable user interfaces, not shown. An exemplary results menu 620 is depicted, containing a conventional list of search results. A revenue-optimizing menu 630, shown here with the exemplary title "Featured Results," lists a plurality of VOD content items that are selected according to an embodiment of the invention. Revenue-optimizing menu 630 lists television content items, selected from the genre of comedy, having the highest values of $ER_T$.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for maximizing revenue in a video-on-demand (VOD) system operated by a service provider, the method comprising:

for a plurality of VOD content items, calculating an expected revenue value ($ER_T$) to the service provider for each content item (T), based on an estimated value of revenue ($R_T$) for the content item, weighted by an estimated probability ($P_T$) that a subscriber will select the content item for viewing;

selecting the one or more highest ranked content items of the plurality of VOD content items, wherein a rank is determined such that content items having higher $ER_T$ values are ranked higher than content items having lower $ER_T$ values; and delivering identifying information about the one or more highest ranked content items to a set-top device associated with the subscriber, for presentation to the subscriber on a menu from which the one or more highest ranked content items can be selected for viewing;

wherein if the content item is an advertising supported content item, $R_T$ is calculated by multiplying a quantity of advertising availabilities allocated to the service provider for the content item, by a cost per impression for which the service provider can sell each of the advertising availabilities, by a retention rate associated with the content item.

2. The method of claim 1, wherein the retention rate associated with the content item is calculated based on a product of a plurality of retention rates associated with a plurality of time periods, each of the time periods corresponding to a portion of the content item.

3. The method of claim 1, wherein $P_T$ is calculated using a sum of one or more non-individualized data items each multiplied by an associated weighting factor.

4. The method of claim 1, wherein $P_T$ is calculated using a sum of one or more individualized data items associated with the subscriber, each multiplied by an associated weighting factor.

5. The method of claim 1, wherein $P_T$ is calculated using a historical click through rate for the content item for a plurality of subscribers over a period of time.

6. The method of claim 1, wherein $P_T$ is calculated using a historical click through rate for other content items related to the content item, for a plurality of subscribers over a period of time.

7. The method of claim 1, wherein $P_T$ is calculated using audience measurement ratings for the content item.

8. The method of claim 1, wherein $P_T$ is calculated using publicly known information about box office revenues for the content item.

9. The method of claim 1, wherein $P_T$ is calculated using social networking information indicative of public interest in the content item.

10. The method of claim 1, wherein $P_T$ is calculated using a previous viewing history associated with the subscriber.

11. The method of claim 1, wherein $P_T$ is calculated using demographic information associated with the subscriber.

12. The method of claim 1, wherein $P_T$ is calculated using geographic information associated with the subscriber.

13. The method of claim 1, wherein $P_T$ is calculated using recorded preferences expressly selected by the subscriber.

14. The method of claim 1, wherein $P_T$ is calculated using preferences of the subscriber for duration of content items.

15. The method of claim 1, wherein $P_T$ is calculated using social networking information associated with individuals in a social network associated with the subscriber.

16. A non-transitory computer readable medium comprising stored instructions which, when executed by a processor, implement the method of claim 1.

17. A method for maximizing revenue in a video-on-demand (VOD) system operated by a service provider, the method comprising:

for a plurality of VOD content items, calculating an expected revenue value ($ER_T$) to the service provider for each content item (T), based on an estimated value of revenue ($R_T$) for the content item, weighted by an estimated probability ($P_T$) that a subscriber will select the content item for viewing;

selecting the one or more highest ranked content items of the plurality of VOD content items, wherein a rank is determined such that content items having higher $ER_T$ values are ranked higher than content items having lower $ER_T$ values; and delivering identifying information about the one or more highest ranked content items to a set-top device associated with the subscriber, for presentation to the subscriber on a menu from which the one or more highest ranked content items can be selected for viewing;

wherein if the content item is an advertising supported content item, $R_T$ is calculated based on a summation of estimated values of revenue associated with a plurality of time periods, each of the time periods corresponding to a portion of the content item; and wherein an estimated value of revenue associated with a time period i is calculated based on multiplying a quantity of advertising availabilities allocated to the service provider for the time period i, by a cost per impression for which the service provider can sell each of the advertising availabilities in the time period i, by a product of all retention rates associated with time periods from 1 through i.

18. A non-transitory computer readable medium comprising stored instructions which, when executed by a processor, implement the method of claim 17.

19. The method of claim 17, wherein $P_T$ is calculated using one or more of the group consisting of:
  a sum of one or more non-individualized data items each multiplied by an associated weighting factor,
  a sum of one or more individualized data items associated with the subscriber, each multiplied by an associated weighting factor,
  a historical click through rate for the content item for a plurality of subscribers over a period of time,
  a historical click through rate for other content items related to the content item, for a plurality of subscribers over a period of time,
  audience measurement ratings for the content item,
  publicly known information about box office revenues for the content item,
  social networking information indicative of public interest in the content item,
  a previous viewing history associated with the subscriber,
  demographic information associated with the subscriber,
  geographic information associated with the subscriber,
  recorded preferences expressly selected by the subscriber,
  preferences of the subscriber for duration of content items, and
  social networking information associated with individuals in a social network associated with the subscriber.

20. A method for maximizing revenue in a video-on-demand (VOD) system operated by a service provider, the method comprising:
  for a plurality of VOD content items, calculating an expected revenue value ($ER_T$) to the service provider for each content item (T), based on an estimated value of revenue ($R_T$) for the content item, weighted by an estimated probability ($P_T$) that a subscriber will select the content item for viewing;
  selecting the one or more highest ranked content items of the plurality of VOD content items, wherein a rank is determined such that content items having higher $ER_T$ values are ranked higher than content items having lower $ER_T$ values; and
  delivering identifying information about the one or more highest ranked content items to a set-top device associated with the subscriber, for presentation to the subscriber on a menu from which the one or more highest ranked content items can be selected for viewing;
  wherein a duration-adjusted value of $ER_T$ is calculated by dividing the product of $R_T$ and $P_T$ by a duration associated with the content item.

21. A non-transitory computer readable medium comprising stored instructions which, when executed by a processor, implement the method of claim 20.

22. The method of claim 20, wherein $P_T$ is calculated using one or more of the group consisting of:
  a sum of one or more non-individualized data items each multiplied by an associated weighting factor,
  a sum of one or more individualized data items associated with the subscriber, each multiplied by an associated weighting factor,
  a historical click through rate for the content item for a plurality of subscribers over a period of time,
  a historical click through rate for other content items related to the content item, for a plurality of subscribers over a period of time,
  audience measurement ratings for the content item,
  publicly known information about box office revenues for the content item,
  social networking information indicative of public interest in the content item,
  a previous viewing history associated with the subscriber,
  demographic information associated with the subscriber,
  geographic information associated with the subscriber,
  recorded preferences expressly selected by the subscriber,
  preferences of the subscriber for duration of content items, and
  social networking information associated with individuals in a social network associated with the subscriber.

23. A video-on-demand (VOD) system operated by a service provider, the system comprising:
  a VOD server communicatively coupled to a content database comprising a plurality of VOD content items;
  a VOD revenue processor configured to calculate, for the plurality of VOD content items, an expected revenue value ($ER_T$) to the service provider for each content item (T), based on an estimated value of revenue ($R_T$) for the content item, weighted by an estimated probability ($P_T$) that a subscriber will select the content item for viewing; and
  a user interface (UI) server communicatively coupled to the VOD revenue processor and to the VOD server, wherein one or more of the VOD revenue processor and the UI server is configured to select the one or more highest ranked content items of the plurality of VOD content items, wherein a rank is determined such that content items having higher $ER_T$ values are ranked higher than content items having lower $ER_T$ values;
  the UI server configured to deliver identifying information about the one or more content items that are highest ranked by $ER_T$ values, to a set-top device associated with a subscriber, for presentation to the subscriber on a menu from which the one or more highest ranked content items can be selected for viewing;
  wherein if the content item is an advertising supported content item, $R_T$ is calculated by multiplying a quantity of advertising availabilities allocated to the service provider for the content item, by a cost per impression for which the service provider can sell each of the advertising availabilities, by a retention rate associated with the content item.

24. The system of claim 23 wherein the VOD revenue processor is communicatively coupled with:
  a metadata database comprising metadata associated with the VOD content items;

a database of aggregated viewing data associated with the VOD content items; and a subscriber database comprising individualized information associated with a plurality of subscribers.

25. A video-on-demand (VOD) system operated by a service provider, the system comprising:

a VOD server communicatively coupled to a content database comprising a plurality of VOD content items;

a VOD revenue processor configured to calculate, for the plurality of VOD content items, an expected revenue value ($ER_T$) to the service provider for each content item (T), based on an estimated value of revenue ($R_T$) for the content item, weighted by an estimated probability ($P_T$) that a subscriber will select the content item for viewing; and a user interface (UI) server communicatively coupled to the VOD revenue processor and to the VOD server, wherein one or more of the VOD revenue processor and the UI server is configured to select the one or more highest ranked content items of the plurality of VOD content items, wherein a rank is determined such that content items having higher $ER_T$ values are ranked higher than content items having lower $ER_T$ values;

the UI server configured to deliver identifying information about the one or more content items that are highest ranked by $ER_T$ values, to a set-top device associated with a subscriber, for presentation to the subscriber on a menu from which the one or more highest ranked content items can be selected for viewing;

wherein if the content item is an advertising supported content item, $R_T$ is calculated based on a summation of estimated values of revenue associated with a plurality of time periods, each of the time periods corresponding to a portion of the content item; and wherein an estimated value of revenue associated with a time period i is calculated based on multiplying a quantity of advertising availabilities allocated to the service provider for the time period i, by a cost per impression for which the service provider can sell each of the advertising availabilities in the time period i, by a product of all retention rates associated with time periods from 1 through i.

26. A video-on-demand (VOD) system operated by a service provider, the system comprising:

a VOD server communicatively coupled to a content database comprising a plurality of VOD content items;

a VOD revenue processor configured to calculate, for the plurality of VOD content items, an expected revenue value ($ER_T$) to the service provider for each content item (T), based on an estimated value of revenue ($R_T$) for the content item, weighted by an estimated probability ($P_T$) that a subscriber will select the content item for viewing; and a user interface (UI) server communicatively coupled to the VOD revenue processor and to the VOD server, wherein one or more of the VOD revenue processor and the UI server is configured to select the one or more highest ranked content items of the plurality of VOD content items, wherein a rank is determined such that content items having higher $ER_T$ values are ranked higher than content items having lower $ER_T$ values;

the UI server configured to deliver identifying information about the one or more content items that are highest ranked by $ER_T$ values, to a set-top device associated with a subscriber, for presentation to the subscriber on a menu from which the one or more highest ranked content items can be selected for viewing;

wherein a duration-adjusted value of $ER_T$ is calculated by dividing the product of $R_T$ and $P_T$ by a duration associated with the content item.

* * * * *